United States Patent
Vondemkamp et al.

(10) Patent No.: US 8,712,422 B1
(45) Date of Patent: Apr. 29, 2014

(54) DYNAMIC ALLOCATION OF ACCESS CHANNELS BASED ON ACCESS CHANNEL OCCUPANCY IN A CELLULAR WIRELESS COMMUNICATION SYSTEM

(75) Inventors: Bret D. Vondemkamp, Shawnee, KS (US); Anand K. Sundaram, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2447 days.

(21) Appl. No.: 11/131,713

(22) Filed: May 18, 2005

(51) Int. Cl.
*H04W 72/00* (2009.01)
(52) U.S. Cl.
CPC .................................... *H04W 72/00* (2013.01)
USPC ......... 455/450; 455/451; 455/452.2; 455/453
(58) Field of Classification Search
USPC ........... 455/450, 451, 452.1, 452.2, 453, 434, 455/435.1, 435.2, 435.3, 515; 370/328
See application file for complete search history.

(56) References Cited

U.S. PATENT DOCUMENTS

| | | | |
|---|---|---|---|
| 5,650,770 A | 7/1997 | Schlager et al. |
| 5,940,743 A | 8/1999 | Sunay et al. |
| 5,963,130 A | 10/1999 | Schlager et al. |
| 6,002,664 A | 12/1999 | Schacter |
| 6,154,638 A | 11/2000 | Cheng et al. |
| 6,198,390 B1 | 3/2001 | Schlager et al. |
| 6,208,873 B1 | 3/2001 | Black et al. |
| 6,243,575 B1 | 6/2001 | Ohyama et al. |
| 6,341,224 B1 | 1/2002 | Dohi et al. |
| 6,442,393 B1 | 8/2002 | Hogan |
| 6,463,286 B1 | 10/2002 | Salminen |
| 6,490,460 B1 | 12/2002 | Soliman |
| 6,496,531 B1 | 12/2002 | Kamel et al. |
| 6,535,736 B1 | 3/2003 | Balogh et al. |
| 6,603,976 B1 | 8/2003 | Amirijoo et al. |
| 6,609,008 B1 | 8/2003 | Whang et al. |
| 6,631,121 B1 | 10/2003 | Yoon |
| 6,681,256 B1 | 1/2004 | Kuntze et al. |
| 6,763,244 B2 | 7/2004 | Chen et al. |
| 6,788,943 B1 * | 9/2004 | Hamalainen et al. ......... 455/450 |
| 6,845,245 B2 | 1/2005 | Hunzinger |
| 6,845,246 B1 | 1/2005 | Steer |
| 6,845,248 B1 | 1/2005 | Johnson |
| 6,944,449 B1 | 9/2005 | Gandhi et al. |
| 6,968,201 B1 | 11/2005 | Gandhi et al. |

(Continued)

FOREIGN PATENT DOCUMENTS

EP 993212 A1 * 4/2000
WO WO 2006/044714 4/2006

OTHER PUBLICATIONS

U.S. Appl. No. 11/073,556, filed Mar. 7, 2005 entitled "Method and System for Management of RF Access probes Based on RF Conditions".
U.S. Appl. No. 11/038,944, filed Jan. 18, 2005 entitled "Method and System for Dynamic Adjustment of Radio Frequency Registration Period Based on Load Conditions".
Non-Final Office Action from U.S. Appl. No. 12/172,102, mailed Jan. 31, 2010.

(Continued)

*Primary Examiner* — Melur Ramakrishnaiah

(57) ABSTRACT

A method and system for dynamically varying the number of air interface access channels in a wireless coverage area, based on actual access channel occupancy in the coverage area. A cellular base station monitors actual access channel occupancy in the coverage area. When the base station detects a threshold level of actual access channel occupancy for a threshold time period, the base station automatically changes the number of access channels available for use by mobile stations operating in the coverage area.

20 Claims, 7 Drawing Sheets

(56) References Cited

U.S. PATENT DOCUMENTS

| | | | |
|---|---|---|---|
| 7,024,217 B2 | 4/2006 | Hunzinger | |
| 7,103,371 B1 * | 9/2006 | Liu | 455/456.4 |
| 7,215,653 B2 | 5/2007 | Kim et al. | |
| 7,221,653 B2 | 5/2007 | Vanghi | |
| 7,228,134 B2 | 6/2007 | Gandhi et al. | |
| 7,260,415 B1 | 8/2007 | Oh | |
| 7,421,248 B1 | 9/2008 | Laux et al. | |
| 7,636,322 B1 | 12/2009 | Gandhi | |
| 2002/0123362 A1 | 9/2002 | Kamel et al. | |
| 2003/0232621 A1 | 12/2003 | Brooks | |
| 2006/0142051 A1 | 6/2006 | Purnadi et al. | |
| 2007/0019589 A1 | 1/2007 | Attar et al. | |
| 2007/0099645 A1 | 5/2007 | Kim | |
| 2007/0149235 A1 | 6/2007 | Chin et al. | |
| 2008/0166976 A1 | 7/2008 | Rao | |
| 2008/0175185 A1 | 7/2008 | Ji et al. | |

OTHER PUBLICATIONS

Unpublished U.S. Appl. No. 12/172,102, entitled "Including Reverse-Link Loading in Determining Transmission Power of Initial Access Probes", filed Jul. 11, 2008 in the name of Siddharth S. Oroskar.

Non-Final Office Action from U.S. Appl. No. 11/073,556, mailed May 11, 2009.

Non-Final Office Action from U.S. Appl. No. 11/073,556, mailed Oct. 27, 2008.

Non-Final Office Action from U.S. Appl. No. 11/073,556, mailed Mar. 13, 2008.

Unpublished U.S. Appl. No. 11/244,893, entitled "Dynamic Load-Based Establishment of Channel-List Messages," filed Oct. 6, 2005 in the name of Jason P. Sigg.

Unpublished U.S. Appl. No. 11/762,534, entitled "Dynamic Adjustment of Reverse-Link Frame-Error-Rate (RFER) Target Based on Reverse-Link RF Conditions," filed Jun. 13, 2007 in the name of Ryan S. Talley.

* cited by examiner

DYNAMIC ALLOCATION OF ACCESS CHANNELS BASED ON ACCESS CHANNEL OCCUPANCY IN A CELLULAR WIRELESS COMMUNICATION SYSTEM

FIELD OF THE INVENTION

The present invention relates to cellular wireless telecommunications and, more particularly, to management of radio frequency access channels.

BACKGROUND

In a typical cellular wireless communication system, an area is divided geographically into a number of cells and cell sectors, each defined by a radio frequency (RF) radiation pattern from a respective base transceiver station (BTS) antenna. The base station antennae in the cells are in turn coupled with a base station controller (BSC), which is then coupled with a switch or gateway that provides connectivity with a transport network such as the public switched telephone network (PSTN) or the Internet. For instance, the BSC may be coupled with a mobile switching center (MSC) that provides connectivity with the PSTN and/or the BSC may be coupled with a packet gateway, such as a packet data serving node (PDSN) or media gateway (MG), that provides connectivity with the Internet.

When a mobile station, such as a cellular telephone, pager, or wirelessly-equipped computer, is positioned in a cell, the mobile station communicates via an RF air interface with the BTS antennae of a cell. Consequently, a communication path can be established between the mobile station and the transport network, via the air interface, the BTS, the BSC and the switch or gateway.

Further, in most wireless communication systems, multiple BTSs are connected with a common BSC, and multiple BSCs are connected with a common switch or gateway. Each BSC may then manage air interface resources for multiple wireless coverage areas (e.g., multiple cells and sectors), by performing functions such as assigning air interface traffic channels for use by mobile stations in the coverage areas and orchestrating handoff of calls between coverage areas. And the switch and/or gateway, in turn, may control one or more BSCs and generally control wireless communications, by performing functions such receiving and processing call requests, instructing BSCs when to assign traffic channels, paging WCDs, and managing handoff of calls between BSCs.

Unlike landline telephones that exist at known, fixed locations, mobile stations can operate at virtually any location where a wireless carrier provides coverage. Consequently, in order for a mobile station to be able to engage in useful communications (e.g., voice or data) in the cellular wireless communication system, the mobile station must first register with the system, so that the system knows where the mobile station is located (e.g., for purposes of directing calls to the mobile station) and so that the system can verify that the mobile station is authorized to be operating in the system, or for other reasons.

The manner in which a mobile station registers with a cellular wireless communication system can take various forms, depending on factors such as the configuration of the system and on the communication protocols used. In a CDMA system, for instance, a mobile station registers by sending over the air to the base station an "access probe," which carries an identifier of the mobile station and perhaps other pertinent information. The mobile station sends the access probe in a "slotted aloha process" in which it repeatedly sends the access probe at increasingly higher power levels until it receives an acknowledgement message from the base station, or until it otherwise exhausts the process (e.g., the maximum transmission power of the mobile station is reached and no acknowledgment has been received). The mobile station may repeat a slotted aloha sequence a number of times, until concluding that an access failure has occurred.

Under CDMA, the air interface between the base station and mobile stations is divided into a number of specially coded channels through which this access probe communication occurs. In particular, on the reverse link (extending from the mobile stations to the base station), the air interface defines at least one time-slotted "access channel," and on the forward link (extending from the base station to the mobile stations), the air interface defines at least one time-slotted "paging channel." Each access probe travels in a timeslot of an access channel to the base station, and each acknowledgement travels in a timeslot of a paging channel from the base station.

In a sector where multiple paging channels are provided, each mobile station operating in the sector may select a paging channel to use (i.e., to listen to) by applying a hash function keyed to the mobile station's electronic serial number. Similarly, if multiple access channels are provided, each mobile station may select an access channel to use (i.e., on which to send access probes) by applying the same or a similar hash function. In this manner, the available paging channels and access channels can be distributed substantially evenly among the mobile stations in the sector.

In a given sector, the slotted aloha process proceeds according to operational parameters that the base station broadcasts in an "access parameters message" on the paging channel to mobile stations operating in the sector. Under CDMA, for instance, the operational parameters include a specification of the number of access channels, an indication of the power at which a mobile station should transmit its initial access probe in the slotted aloha sequence, the extent to which the mobile station should increase transmit power for each successive access probe, and the number of access probes per slotted aloha sequence, among others.

When the base station receives an access probe from a mobile station, the base station then passes the access probe along to the switch (mobile switching center (MSC)) or other entity, which then responsively sends a registration notification message to the mobile station's home location register (HLR). The HLR then updates the mobile station's profile to indicate where the mobile station is operating (e.g., which switch is serving the mobile station) and may further carry out an authentication process, and then sends a registration response, which propagates to the mobile station.

Various trigger events can cause mobile stations to register with the system. Under CDMA, for instance, a mobile station will generally register (i) whenever it enters a new zone, as indicated by a distinct zone parameter the mobile station receives in an air interface control channel message from the base station, (ii) on a periodic basis, (iii) when the mobile station places a call, as a prerequisite to call placement, and (iv) when the mobile station responds to a page message indicative of an incoming call.

In some situations, the air interface (e.g., a particular sector defined by a base station) can become overwhelmed with too much use. This can happen, by way of example, if too many mobile station registrations occur at once. In a CDMA system, for instance, if access probes from two or more mobile stations line up (by chance) in the same timeslot of an access channel, an "access probe collision" occurs. The result of such a collision is that none of the probes will succeed, principally because the base station will not receive any of the probes in a comprehensible form due to interference between the probes. Thus, each mobile station would have to re-send its access probe, because it would not receive an acknowledgement from the base station.

In many situations, access probe collisions are not very likely to occur, because sufficient timeslots exist on the access channel. However, in situations where many users are turning on their mobile phones or placing calls at once, the number of access probes and access probe collisions can increase exponentially (or at least greatly). For example, after a football game or in an emergency situation, many people within a given sector may use their mobile phones to place calls (e.g., to call 911, to call friends and family, to check voice mail, or for other purposes). Each time a mobile station goes to place a call, as noted above, the mobile station would send an access probe. Consequently, in a situation where many people within a given sector place calls at once, many access probes will be sent at once. In turn, access probe collisions would occur, and so still more (re-try) access probes will be sent. Further, as this is occurring, mobile stations will be periodically registering with the system, which will still further increase the frequency of access probe collisions.

Unfortunately, as an access channel becomes more and more occupied with access probes, two undesired effects will tend to occur. First, the number of access probe collisions will tend to increase, which means that registrations will take longer to successfully complete. In placing and receiving calls, this longer registration process translates into longer call setup time, which in turn translates into an unacceptable user experience. Second, as mobile stations exhaust the slotted aloha process, the number of ultimate access failures will tend to increase. In placing and receiving calls, these access failures will be perceived as blocked calls, which will also result in unacceptable user experience. Therefore, an improvement is desired.

SUMMARY

The present invention is directed to a method and system for dynamically setting the number of access channels available for use in a wireless coverage area, in order to reduce the likelihood that the foregoing problems will occur. In a preferred embodiment, a computer system (such as a base station) will monitor the level of actual access channel occupancy in the wireless coverage area, such as the percentage of access channel timeslots actually in use in the coverage area, and the computer system will automatically use a measure of the actual access channel occupancy as a basis to set the number of access channels in the coverage area.

Most preferably, the computer system will be embodied in a base station. In practice, (i) the base station will automatically increment the number of access channels when the actual access channel occupancy hits an upper threshold, and (ii) the base station will automatically decrement the number of access channels when the actual access channel occupancy hits a lower threshold. Further, the base station will maintain at least one access channel in the coverage area, and the base station may limit the number of access channels to not exceed a specified maximum number.

By automatically changing the number of access channels based on a measure of actual access channel occupancy in the coverage area, the invention can advantageously provide more access channel capacity at times when more access channel communications are occurring and less access channel capacity at times when less access channel communications are occurring. This is particularly advantageous given that each access channel consumes certain air interface resources, such as Walsh codes and channel elements for instance.

Further, since the process occurs dynamically based on measures of actual access channel occupancy, the process can dynamically account for unexpected changes in access channel use. In this manner, the invention advances beyond the existing process of setting the number of access channels in advance by engineering design.

The invention also advances beyond existing systems that allocate a number of access channels based merely on the number of idle mobile stations currently operating in the wireless coverage area (as described in U.S. Pat. No. 6,681,256 for instance). Such an existing system does not account for actual access channel occupancy, which is the real issue. Indeed, adjusting the number of access channels based just on the number of mobile stations in the coverage area could result in a wasteful increase in the number of access channels if the access channel occupancy is actually not high (e.g., if the many mobile stations in the coverage area are not engaging in access channel communication). Similarly, adjusting the number of access channels based just on the number of mobile stations in the coverage area could cause an insufficient number of access channels to exist if the access channel occupancy is actually very high (e.g., if the small number of mobile stations are engaging in substantial access channel communication, such as if they are all at a border area where they are repeatedly registering as they fade in and out of system coverage).

The foregoing as well as other aspects, advantages, and alternatives will become apparent to those of ordinary skill in the art by reading the following detailed description, with reference where appropriate to the accompanying drawings.

DETAILED DESCRIPTION OF AN EXEMPLARY EMBODIMENT

While an embodiment of the invention is discussed generally in the context of CDMA wireless communication systems, it will be appreciated that the invention is not limited in this respect and that the invention may be implemented in any number of types of wireless communication systems, such as time division multiple access (TDMA) systems and global system for mobile communications (GSM) systems, for example. As in most telecommunication and data applications, it will also be appreciated that many of the elements of the various embodiments described herein are functional entities that may be implemented as hardware, firmware and/ or software. Additionally, many of these elements may be implemented as discrete components or in conjunction with other components, in any suitable combination and location.

1. EXAMPLE ARCHITECTURE

Figure 1:
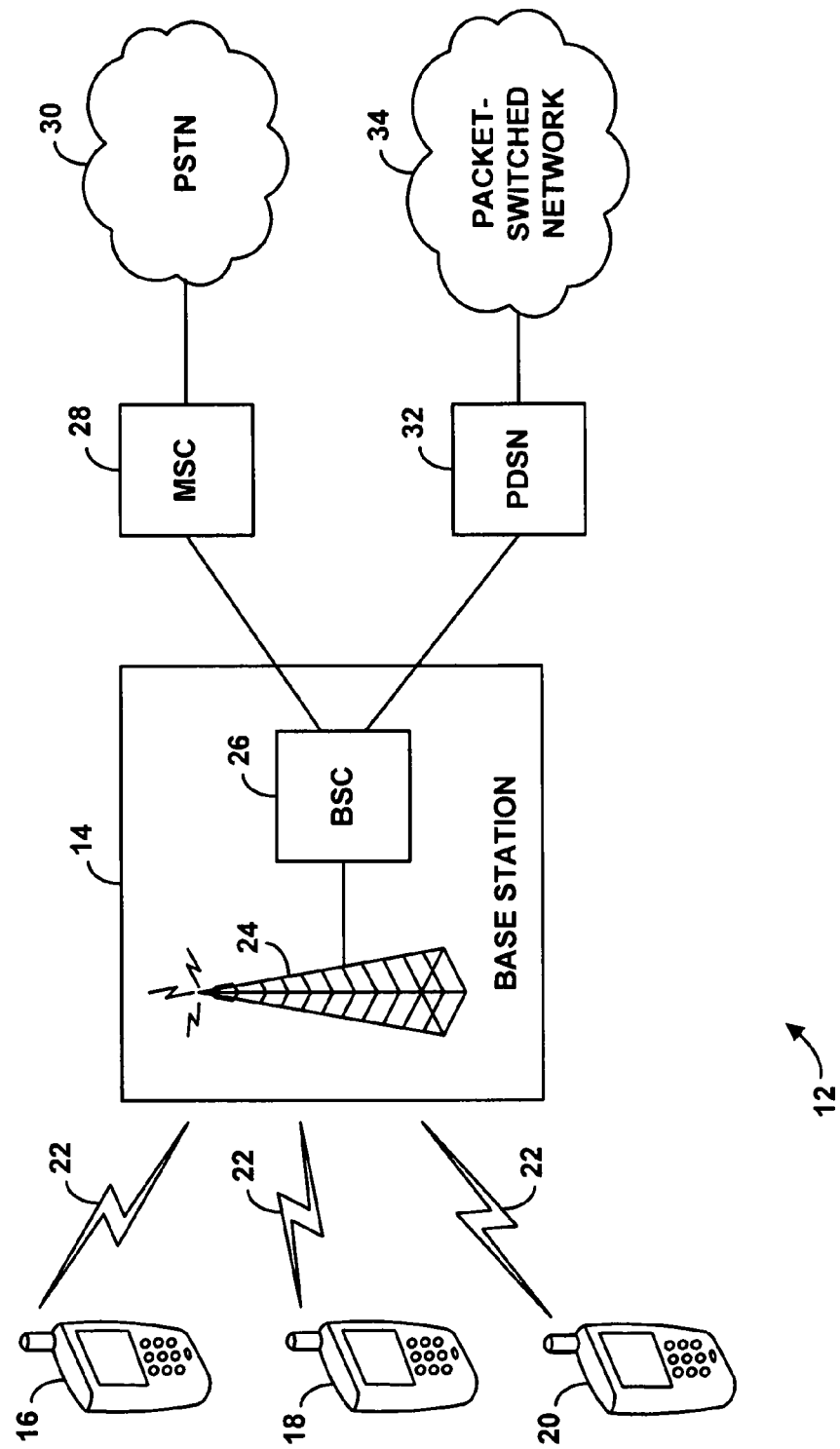
FIG. 1 is a block diagram of a wireless communication system in which an exemplary embodiment of the invention can be implemented.

Referring to the drawings, FIG. 1 is a diagram illustrating a wireless communication system 12 in which an exemplary embodiment of the invention may be implemented. System 12 includes at its core a base station 14, which communicates with a plurality of mobile stations 16, 18, 20 over a radio air interface 22. Mobile stations 16, 18, 20 may be cellular phones, wireless personal digital assistants, wireless enabled computers or any other devices capable of wireless communication in system 12. Further, although only three mobile stations are shown, system 12 can serve any number of mobile stations.

As shown, base station 14 includes a base transceiver station (BTS) 24, which communicates with mobile stations 16, 18, 20 using radio-frequency signals over air interface 22. BTS 24 is then coupled with a base station controller (BSC) 26, which controls air interface communication and is coupled in turn with one or more switches or gateways that provide connectivity with one or more transport networks. By way of example, BSC 26 may be connected with a mobile switching center (MSC) 28 that provides connectivity with the public switched telephone network (PSTN) 30, and BSC 26 may be connected with a packet data serving node (PDSN) 32 that provides connectivity with a packet-switched network 34 such as the Internet or a wireless carrier's core packet network. With this arrangement, depending on how mobile stations 16, 18, 20 are equipped, mobile stations 16, 18, 20 may be able to engage in communications on PSTN 30 and on packet-switched network 34 in a manner well known to those skilled in the art.

Figure 2:
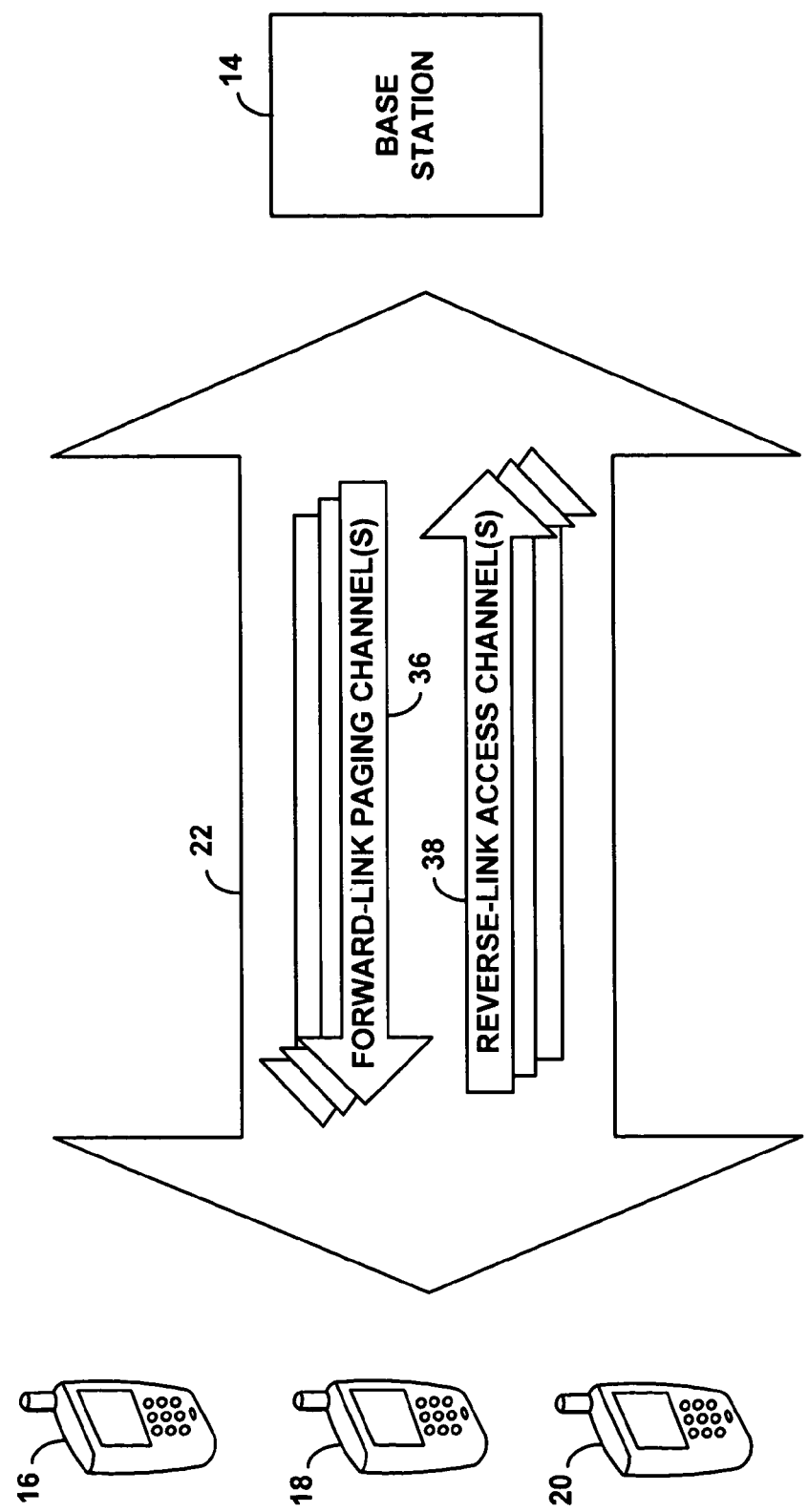
FIG. 2 is a block diagram illustration of a portion of an air interface in the arrangement of FIG. 1.

FIG. 2 is a diagram illustrating a portion of system 12, with air interface 22 depicted in more detail. This air interface represents a wireless coverage area, such as a cell sector for instance.

As shown by way of example in FIG. 2, air interface 22 includes at least one forward-link paging channel 36 and at least one reverse-link access channel 38. Each forward-link paging channel 36 carries page messages, the access parameters message noted above, and other control messages from base station 14 to mobile stations 16, 18, 20. Each reverse-link access channel 36, on the other hand, carries access probes and other control messages from mobile stations 16, 18, 20 to base station 14. In a CDMA system, each of these channels may be defined by encoding and modulating with a respective Walsh code in a manner well known in the art. Under other protocols, the channels may be defined in other ways and may have other names.

Figure 3:
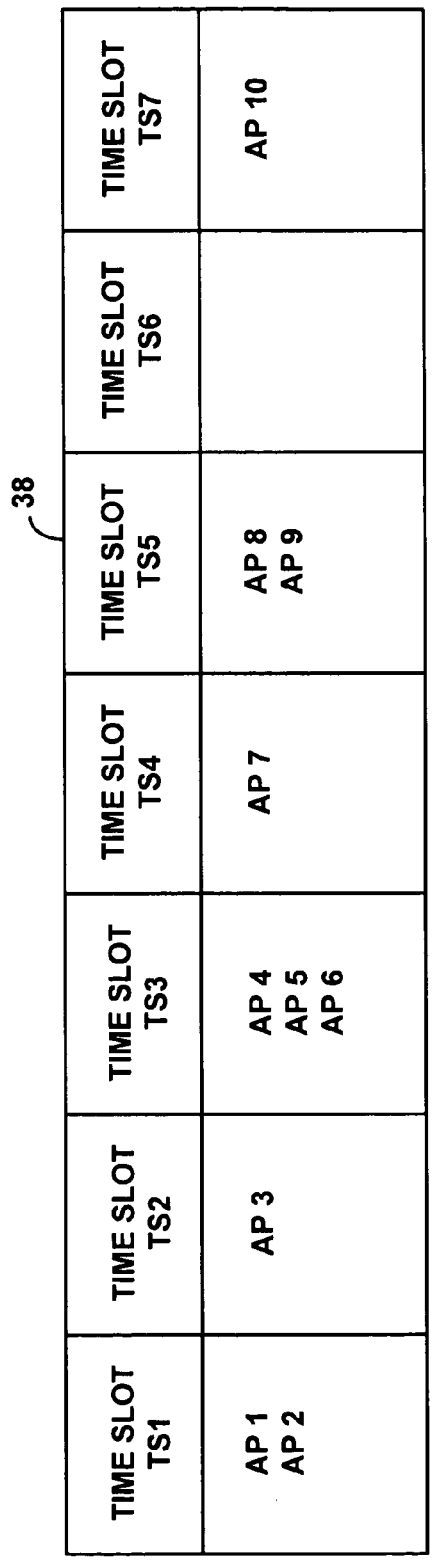
FIG. 3 is a table illustrating example access channel timeslots.

FIG. 3 is next a table illustrating how access probes are communicated from mobile stations to a base station in a CDMA system. The table in FIG. 3 shows seven consecutive timeslots in a reverse-link access channel 38 of the air interface 22 of FIGS. 1 and 2. The table in FIG. 3 represents the timeslots of an access channel 38 for a particular sector in a wireless communications system. These timeslots are designated TS1 through TS7. In each timeslot, access probes that are communicated by the mobile stations operating in this particular sector are shown in a respective column. FIG. 3 depicts ten example access probes, designated AP1 through AP10.

As explained above, access probe transmission failures can occur for various reasons, the principle one being access probe collisions. With the situation illustrated in FIG. 3, for instance, access probe collisions would likely occur in timeslots TS1, TS3 and TS5, because more than one access probe is being sent to the base station 14 in each of those timeslots. When access probes collide, the base station would not successfully receive the access probes, and new access probes would have to be sent. If a large number of mobile stations are attempting to register in the particular sector, the number of timeslots that experience access probe collisions may increase and, consequently the number of retries being attempted and associated access probe collisions will continue to grow.

Figure 4:
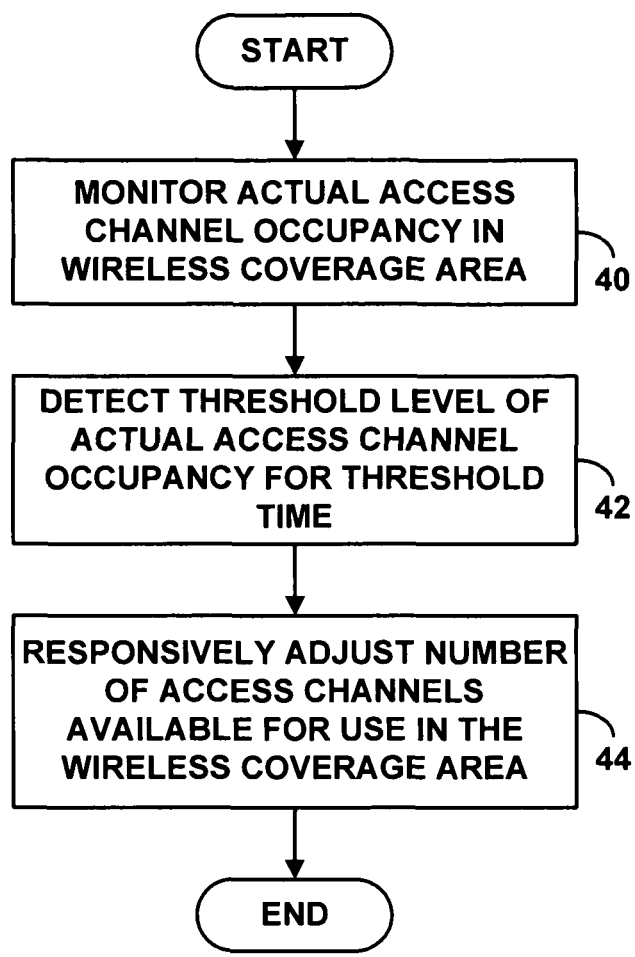
FIG. 4 is a flow chart depicting functions carried out in accordance with the exemplary embodiment.

In accordance with the exemplary embodiment, the number of access channels available for use in a wireless coverage area will be adjusted dynamically based on the actual access channel occupancy in the wireless coverage area. FIG. 4 is next a flow chart depicting functions carried out in accordance with the exemplary embodiment.

As shown in FIG. 4, at block 40, a computer system will monitor actual access channel occupancy (ACO) in the wireless coverage area, i.e., on air interface 22. At block 42, the computer system will thereby detect a threshold level of actual access channel occupancy, preferably for a threshold period of time. At block 44, the computer system will then responsively adjust the number of access channels available for use in the wireless coverage area.

For instance, if the computer system detects that the actual ACO is greater than or equal to an upper threshold level for a threshold period of time, then the computer system may increment the number of access channels. Whereas, if the computer system detects that the actual ACO is less than or equal to a low threshold level for a threshold period of time, then the computer system may decrement the number of access channels. Preferably, the computer system will iteratively repeat this process so as to continuously maintain a number of access channels that is in line with the latest measure of actual access channel occupancy in the coverage area.

As noted, this process is preferably carried out by a computer system. Most preferably, the computer system is integrated with the base station 14 or comprises the base station 14 itself. However, the computer system may alternatively include other elements (such as MSC 28) or may take other forms and be located elsewhere. For instance, the computer system may comprise one or more computer servers residing on the wireless carrier's core packet network and coupled with base station 14. Other arrangements are possible as well.

Figure 5:
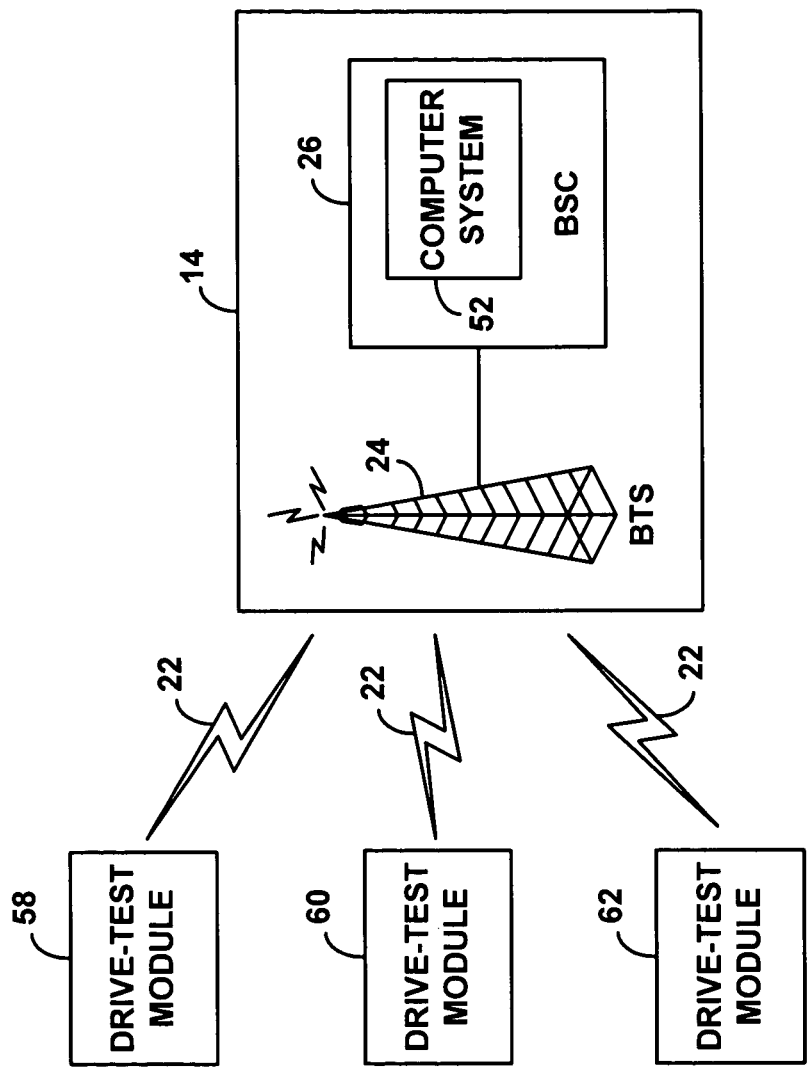
FIG. 5 is a block diagram of a wireless communication system for implementing the exemplary embodiment.

FIG. 5 is a block diagram illustrating by way of example how the wireless communication system 12 of FIG. 1 can be adapted to implement the present invention. In this arrangement, the computer system is shown as a function of base station 14 and particularly as a function 52 of BSC 26.

Figure 6:
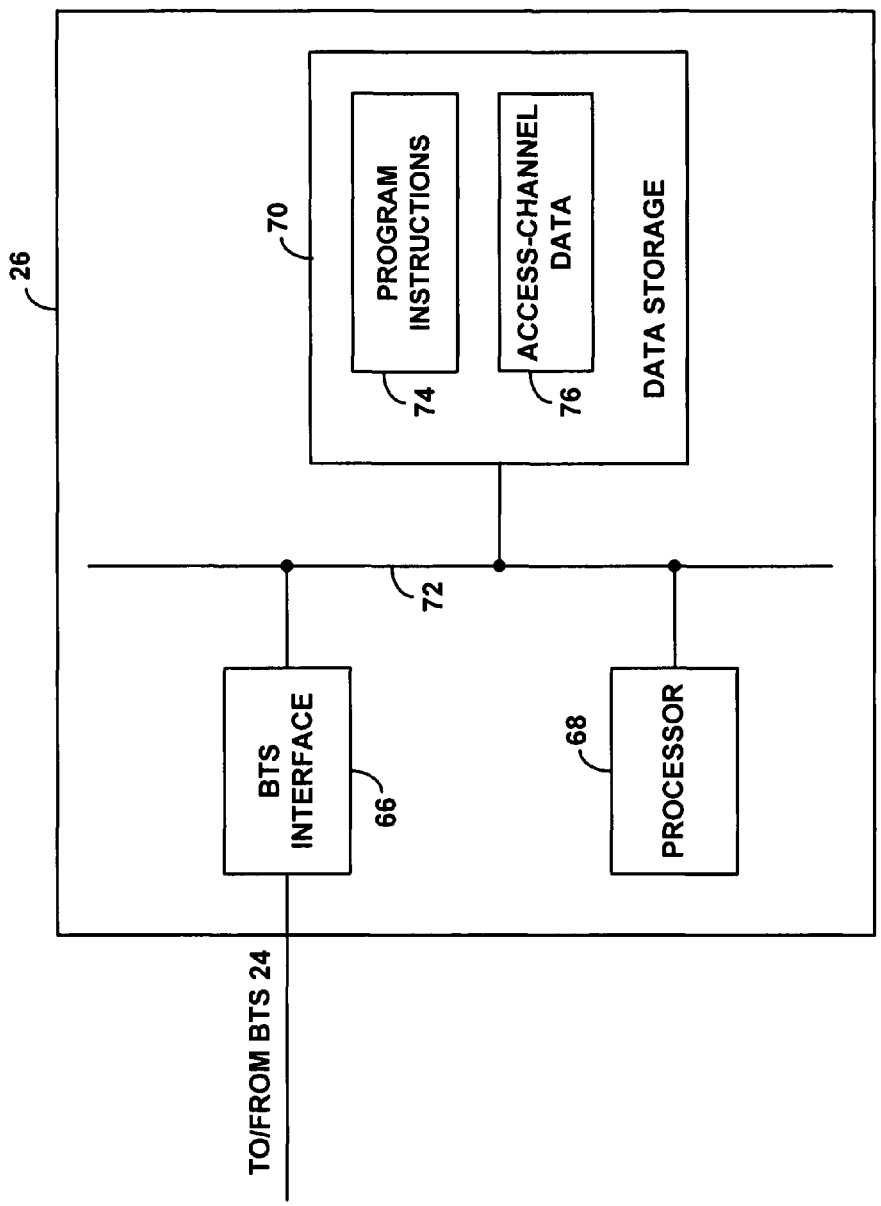
FIG. 6 is a block diagram of a base station controller arranged to carry out functions of the exemplary embodiment.

FIG. 6 is a more detailed block diagram of BSC 26, depicting some of the functional components that the BSC would preferably include in order to carry out the functions shown in FIG. 4. As shown by way of example in FIG. 6, BSC 26 includes a BTS interface 66, a processor 68, and data storage 70, all of which are communicatively linked together by a system bus, network, or other mechanism 72.

BTS interface 66 provides for connection with BTS 24, for purposes of sending the access parameters message to mobile stations, for engaging in other control communication with mobile stations, and for conveying voice and data between mobile stations and one or more transport networks. Although not shown, BSC 26 may of course further include interfaces for communicating with MSC 28 and PDSN 32.

Processor 68 comprises one or more general-purpose processors (e.g., INTEL microprocessors) and/or one or more special-purpose processors (e.g., discrete digital signal processing units or other logic circuits). Data storage 70 in turn comprises volatile and/or non-volatile storage components, such as optical, magnetic or other memory or disc storage, which can be integrated in whole or in part with processor 68. As shown, data storage 70 contains program instructions 74 that are executable by processor 68 to carry out various functions described herein. (Processor 68 may outsource some functions as well.)

Further, in use, data storage 70 includes access-channel data 76, which preferably includes (i) a count of available access channels in the coverage area and (ii) access channel use-statistics for the coverage area. In operation, BSC 26 preferably includes in the access parameters message that it sends to mobile stations in the coverage area an indication of the count of available access channels. Further, the BSC 26 uses the access channel use-statistics as a basis to trigger dynamic adjustment of the number of access channels in the coverage area.

2. EXAMPLE OPERATION

The following sections now address in more detail the functions depicted generally in the flow chart of FIG. 4. As noted above, this implementation is described by way of example only, and many variations are possible.

a. Monitoring Access Channel Occupancy

In the preferred embodiment, BSC 26 will regularly monitor the level of actual access channel occupancy in the wireless coverage area, so that the BSC can detect when the access channel occupancy is at a threshold level.

In practice, the BSC may carry out this monitoring function by logging over time (e.g., every minute or every five minutes) the number or percentage of access channel timeslots that are actually occupied in the coverage area. For this purpose, the BSC can consider an access channel timeslot to be occupied if it contains energy that is sufficient to be an access probe, even if the timeslot does not actually contain a CRC-verifiable access probe. Alternatively, the BSC can apply other rules to determine if a given timeslot is actually occupied.

Preferably, the BSC will monitor access channel occupancy for the coverage area as a whole. Thus, if only one access channel is currently defined for use in the coverage area, then the BSC may consider access channel occupancy to be a percentage of actually occupied timeslots in that one access channel. On the other hand, if three access channels are currently defined for use in the coverage area, then the BSC may consider access channel occupancy to be a percentage of actually occupied timeslots, in total, in those three access channels. Alternatively, if more than one access channel exists in the coverage area, the BSC can separately monitor the occupancy of each access channel.

The BSC may be programmed to maintain a running average of access channel occupancy over time and may thus deem the actual access channel occupancy of the coverage area (or of a given access channel in the coverage area) to be the current value of the running average. As another example, the BSC may deem the actual access channel occupancy to be simply the percentage of timeslots occupied in a most recent time period (such as in the past minute), without averaging with prior time periods. Other examples are possible as well.

b. Detecting Threshold Access Channel Occupancy, and Responsively Adjusting the Number of Access Channels In the preferred embodiment, the BSC will detect when the actual access channel occupancy in the wireless coverage area hits a threshold level and remains at or beyond the threshold level for a threshold time period, and the BSC will responsively adjust the number of access channels available for use in the coverage area. (In this regard, the concepts of "meeting" or "exceeding" (falling beyond) a threshold should be considered identical concepts.) Preferably, the BSC will be programmed to use an upper threshold (e.g., 70% occupancy) to trigger an increase in the number of access channels and a lower threshold (e.g., 30% occupancy) to trigger a decrease in the number of access channels. Further, the BSC may be programmed to limit the number of access channels to no less than one (so that at least one is always available) and no more than a designated maximum number.

As one way to carry out this function, the BSC may continuously determine if the current measure of actual access channel occupancy for the coverage area as a whole (i.e., considering all available access channels in the coverage area) meets or exceeds the designated threshold. When the BSC first detects that the current measure meets or exceeds the threshold, the BSC may responsively begin decrementing a dwell timer. If the BSC determines that the actual access channel occupancy for the coverage area as a whole continues to meet or exceed the designated threshold for the duration of the dwell timer, then the BSC may responsively adjust the number of access channels available for use in the coverage area.

Figure 7:
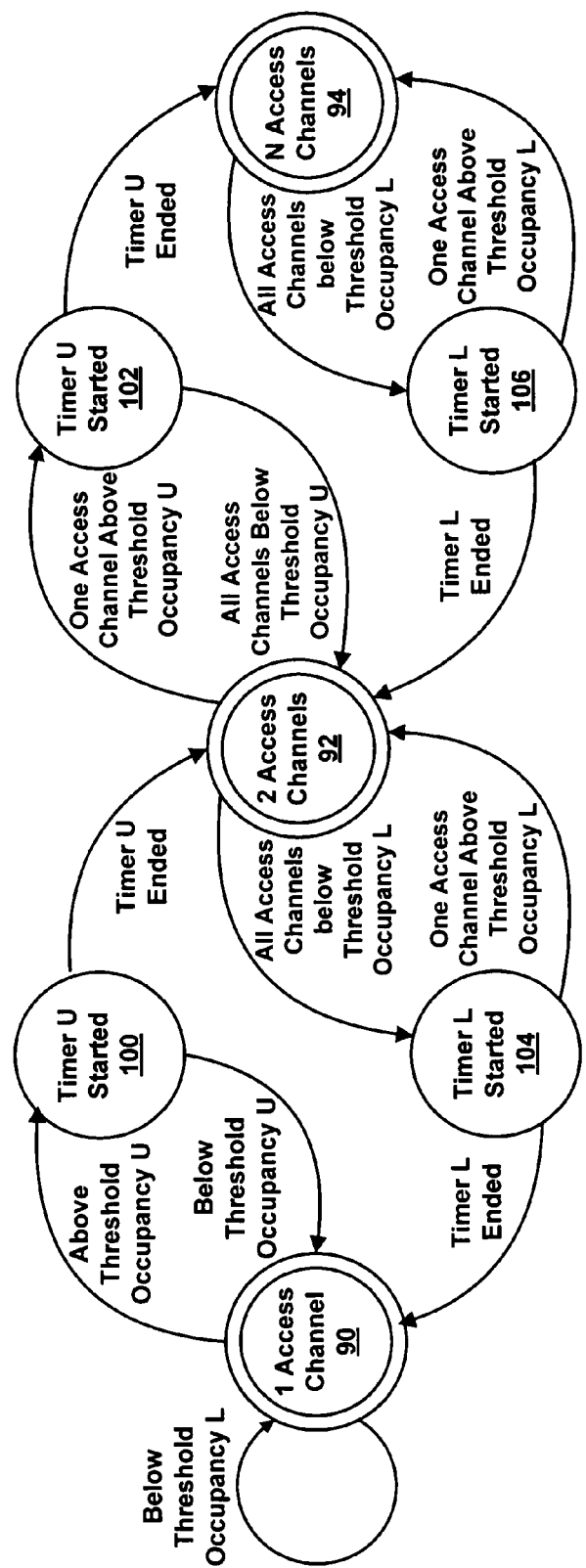
FIG. 7 is a state diagram illustrating operation of the exemplary embodiment.

Alternatively, the BSC may use the access channel occupancy of one or more individual access channels in the coverage area as a basis to determine when a threshold access channel occupancy condition exists, and to responsively trigger an adjustment in the number of access channels. For instance, with a given number of access channels available for use in the coverage area, the BSC can automatically increment the number of access channels if the occupancy of at least one access channel exceeds an upper threshold for a designated dwell period, and the BSC can automatically decrement the number of access channels if the occupancy of all of the available access channels is below a lower threshold for a designated dwell period. FIG. 7 is a state diagram depicting an example of how the BSC can do this in practice.

The process of FIG. 7 assumes, by way of example, that the BSC is programmed to consider an upper ACO threshold ("Threshold U") and a lower ACO threshold ("Threshold L"). Further, the process assumes that the BSC is programmed to use separate dwell timers for the upper threshold ("Timer U") and the lower threshold ("Timer L"), each with a respective dwell time period. In an alternative embodiment, a common dwell timer and/or a common dwell time period can be used for both thresholds.

FIG. 7 depicts three main states 90, 92, 94, each representing, by way of example, a respective number of access channels available for use in the wireless coverage area. As explained above, the BSC can make a particular number of access channels available for use in the coverage area by specifying the number as a parameter in the access parameters message that the BSC sends to mobile stations in the coverage area. The BSC may also define each access channel by specifying one or more channel characteristics (e.g., a Walsh code) that mobile stations can use to facilitate communication on the channel.

At state 90, the wireless coverage area has only one access channel available for use. In that state, if the BSC detects that the access channel occupancy of the sole access channel exceeds the upper threshold, then the BSC moves to state 100, where it begins to decrement the upper threshold dwell timer.

While decrementing the upper threshold dwell timer at state 100, if the BSC detects that the access channel occupancy of the sole access channel falls below the upper threshold, then the BSC stops decrementing (and resets) the upper threshold dwell timer, and the BSC returns to state 90 where it maintains a single access channel in the coverage area.

On the other hand, if the BSC determines that the access channel occupancy of the sole access channel stays above the upper threshold for the duration of the upper threshold dwell timer, then the BSC responsively increments the number of access channels available for use in the coverage area, thus moving to state 92 where two access channels are now available for use in the coverage area. (Preferably, the BSC increments by one access channel at a time; however, the BSC could use other increments instead.)

As shown by the loop arrow on the far left of FIG. 7, if the BSC detects that the access channel occupancy of the sole access channel drops to below the lower threshold, the BSC stays at state 90, rather than eliminating the sole access channel. That way, BSC always maintains at least one access channel available for use in the coverage area.

At state 92, the wireless coverage area thus has two access channels available for use. In that state, if the BSC detects that the access channel occupancy of at least one of the two access channels exceeds the upper threshold, then the BSC moves to state 102, where it begins to decrement the upper threshold dwell timer.

While decrementing the upper threshold dwell timer at state 102, if the BSC detects that the access channel occupancy of both access channels falls below the upper threshold, then the BSC stops decrementing (and resets) the upper threshold dwell timer, and the BSC returns to state 92 where it maintains two access channels in the coverage area.

On the other hand, if the BSC determines that the access channel occupancy of the at least one access channel stays above the upper threshold for the duration of the upper threshold dwell timer, then the BSC responsively increments the number of access channels available for use in the coverage area, thus moving to state 94 where N channels are now available for use in the coverage area. (In an exemplary embodiment, N can be three. More generally N can represent any maximum number of access channels that BSC will make available for use in the coverage area. Other incremental numbers of access channels (not shown) could exist before state 94.)

Alternatively, while at state 92, if the BSC detects that the access channel occupancy of both access channels drops below the lower threshold, then the BSC moves to state 104, where it begins to decrement the lower threshold dwell timer.

While decrementing the lower threshold dwell timer at state 104, if the BSC detects that the access channel occupancy of at least one of the access channels exceeds the upper threshold, then the BSC stops decrementing (and resets) the lower threshold dwell timer, and the BSC returns to state 92, where it maintains two access channels in the coverage area.

On the other hand, if the BSC determines that the access channel occupancy of both access channels stays below the lower threshold for the duration of the lower threshold dwell timer, then the BSC responsively decrements the number of access channels available for use in the coverage area, thus moving to state 90, where just one access channel is available for use in the coverage area.

At state 94, the wireless coverage area thus has N access channels available for use. In that state, if the BSC detects that the access channel occupancy of all of the access channels drops below the lower threshold, then the BSC moves to state 106, where it begins to decrement the lower threshold dwell timer.

While decrementing the upper threshold dwell timer at state 106, if the BSC detects that the access channel occupancy of at least one of the N access channels exceeds the upper threshold, then the BSC stops decrementing (and resets) the lower threshold dwell timer, and the BSC returns to state 94, where it maintains N access channels in the coverage area.

On the other hand, if the BSC determines that the access channel occupancy of all N access channels stays below the lower threshold for the duration of the lower threshold dwell timer, then the BSC responsively decrements the number of access channels available for use in the coverage area, thus moving to state 90, where two (or more generally N–1) access channels are available for use in the coverage area.

In an alternative embodiment, note that that BSC 26 can dynamically adjust the number of access channels in a wireless coverage area in response to detecting a threshold level of access channel occupancy in the coverage area, without applying a dwell timer. For instance, each time the BSC detects an upper threshold level of access channel occupancy (e.g., with respect to one or all access channels currently available for use), the BSC may automatically increment the number of access channels available for use. And each time the BSC detects a lower threshold level of access channel occupancy (e.g., with respect to one or all access channels currently available for use), the BSC may automatically decrement the number of access channels available for use.

3. CONCLUSION

An exemplary embodiment of the present invention has been described above. Those skilled in the art will understand, however, that changes and modifications may be made to this embodiment without departing from the true scope and spirit of the present invention, which is defined by the claims.

We claim:

1. A method comprising:
   a computer system monitoring actual access channel occupancy in a wireless coverage area;
   detecting, by the computer system, a threshold level of actual access channel occupancy in the wireless coverage area; and
   in response to detecting the threshold level of actual access channel occupancy in the wireless coverage area, the computer system automatically adjusting a quantity of access channels available for use in the wireless coverage area, wherein, in operation, each access channel available in the wireless coverage area consumes a respective Walsh code of the wireless coverage area.

2. The method of claim 1, wherein detecting the threshold level of actual access channel occupancy in the wireless coverage area comprises detecting that the threshold level exists for a designated dwell period.

3. The method of claim 1, further comprising carrying out the monitoring, detecting, and adjusting functions at a base station that serves the wireless coverage area.

4. The method of claim 1, wherein monitoring actual access channel occupancy in the wireless coverage area comprises determining a percentage of available access channel timeslots actually used in the wireless coverage area.

5. The method of claim 4,
   wherein determining the percentage of available access channel timeslots actually used comprises determining the percentage of available access channel timeslots actually used over the course of a predefined time period, and
   wherein detecting the threshold level of actual access channel occupancy comprises detecting that the percentage satisfies a threshold condition.

6. The method of claim 4,
wherein monitoring the actual access channel occupancy comprises maintaining a running average of a percentage of available access channel timeslots actually used over time, and
wherein detecting the threshold level of actual access channel occupancy comprises detecting that the running average satisfies a threshold condition.

7. The method of claim 1, wherein the threshold level of actual access channel occupancy is an upper threshold, and wherein adjusting a quantity of access channels available for use in the wireless coverage area comprises incrementing the quantity of access channels available for use in the wireless coverage area.

8. The method of claim 1, wherein the threshold level of actual access channel occupancy is a lower threshold, and wherein adjusting a quantity of access channels available for use in the wireless coverage area comprises decrementing the quantity of access channels available for use in the wireless coverage area.

9. The method of claim 1, further comprising maintaining at least one access channel available for use in the wireless coverage area.

10. The method of claim 1, further comprising limiting the quantity of access channels available for use in the wireless coverage area to be no more than a predefined maximum number of access channels.

11. The method of claim 1, wherein adjusting the quantity of access channels available for use in the wireless coverage area comprises:
changing the quantity from a first quantity to a second quantity, and
broadcasting a control channel message indicative of the second quantity.

12. The system of claim 11, wherein adjusting the quantity of access channels available for use in the wireless coverage area comprises:
changing the quantity from a first quantity to a second quantity, and
broadcasting a control channel message indicative of the second quantity.

13. A system comprising:
an antenna structure arranged to radiate so as to produce a wireless coverage area in which one or more wireless communication devices can operate;
a processor;
data storage; and
program instructions stored in the data storage and executable by the processor to perform functions including:
monitoring actual access channel occupancy in the wireless coverage area, and
detecting a threshold level of actual access channel occupancy in the wireless coverage area; and
in response to detecting the threshold level of actual access channel occupancy in the wireless coverage area, automatically adjusting a quantity of access channels available for use in the wireless coverage area, wherein, in operation, each access channel available in the wireless coverage area consumes a respective Walsh code of the wireless coverage area.

14. The system of claim 13, wherein detecting the threshold level of actual access channel occupancy in the wireless coverage area comprises detecting that the threshold level exists for a designated dwell period.

15. The system of claim 13, wherein monitoring actual access channel occupancy in the wireless coverage area comprises determining a percentage of available access channel timeslots actually used in the wireless coverage area.

16. The system of claim 15,
wherein determining the percentage of available access channel timeslots actually used comprises determining the percentage of available access channel timeslots actually used over the course of a predefined time period, and
wherein detecting the threshold level of actual access channel occupancy comprises detecting that the percentage satisfies a threshold condition.

17. The system of claim 15,
wherein monitoring the actual access channel occupancy comprises maintaining a running average of a percentage of available access channel timeslots actually used over time, and
wherein detecting the threshold level of actual access channel occupancy comprises detecting that the running average satisfies a threshold condition.

18. The system of claim 13, wherein the threshold level of actual access channel occupancy is an upper threshold, and wherein adjusting a quantity of access channels available for use in the wireless coverage area comprises incrementing the quantity of access channels available for use in the wireless coverage area.

19. The system of claim 13, wherein the threshold level of actual access channel occupancy is a lower threshold, and wherein adjusting a quantity of access channels available for use in the wireless coverage area comprises decrementing the quantity of access channels available for use in the wireless coverage area.

20. A method comprising:
a computer system making a number of access channels available for use in a wireless coverage area, wherein, in operation, each access channel available in the wireless coverage area consumes a respective Walsh code of the wireless coverage area;
the computer system automatically incrementing the number of access channels when actual occupancy of at least one of the access channels is greater than an upper threshold for a first designated dwell period; and
the computer system automatically decrementing the number of access channels when actual occupancy of at least one of the access channels is less than a lower threshold for a second designated dwell period.

* * * * *